United States Patent
Lynch et al.

(10) Patent No.: US 8,697,808 B2
(45) Date of Patent: Apr. 15, 2014

(54) PROCESS FOR MAKING ETHYLENE POLYMER BLENDS WITH CONTROLLED LONG-CHAIN BRANCHING

(75) Inventors: Michael W. Lynch, West Chester, OH (US); Kenneth J. Klug, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 658 days.

(21) Appl. No.: 12/941,149

(22) Filed: Nov. 8, 2010

(65) Prior Publication Data

US 2012/0116022 A1     May 10, 2012

(51) Int. Cl.
*C08L 23/04*     (2006.01)
*C08L 23/06*     (2006.01)

(52) U.S. Cl.
USPC ............... 525/240; 525/52; 525/53; 525/191; 525/197

(58) Field of Classification Search
USPC .......................... 525/50, 52, 53, 191, 197, 240
See application file for complete search history.

(56) References Cited

U.S. PATENT DOCUMENTS

| | | | |
|---|---|---|---|
| 4,499,198 A | 2/1985 | Pullukat et al. | |
| 5,236,998 A | 8/1993 | Lundeen et al. | |
| 6,713,585 B1 | 3/2004 | Mavridis et al. | |
| 7,655,858 B2 | 2/2010 | Esser et al. | |
| 2009/0048402 A1 * | 2/2009 | Lynch et al. | 525/240 |
| 2013/0075409 A1 * | 3/2013 | Kapur et al. | 220/562 |

FOREIGN PATENT DOCUMENTS

WO     WO 2005012371 A2 *    2/2005     ............. C08F 10/00

OTHER PUBLICATIONS

Grieveson, B.M. Die Makromolekulare Chemie vol. 84 (1965) pp. 93-107.*
U.S. Appl. No. 11/897,438, filed Aug. 29, 2007, Wang et al.
R. Shroff and H. Mavridis, "New Measures of Polydispersity from Rehological Data on Polymer Melts," *J. Appl. Polym., Sci.* 57, (1995), 1605-1626.
Stadler, Florian J. et al., "Influence of Type and Content of Various Comonomers on Long-Chain Branching of Ethene/α-Olefin Copolymers," *Macromolecules*, 39, (2006), 1474-1482.

* cited by examiner

*Primary Examiner* — Irina S Zemel
*Assistant Examiner* — Jeffrey Lenihan

(57) ABSTRACT

A high-temperature solution process for making an ethylene polymer blend having a controlled degree of long-chain branching is disclosed. Ethylene is polymerized in the presence of a first Ziegler-Natta catalyst comprising titanium, magnesium, and aluminum in the absence of hydrogen to produce a first ethylene polymer component having substantial long-chain branching. A second ethylene polymer component having little or no long-chain branching is also prepared. Both polymerizations are performed at a temperature from 140° C. to 250° C. The first and second ethylene polymer components are combined to give a polymer blend. The degree of long-chain branching in the blend is controlled by adjusting the relative amounts of the first and second ethylene polymer components. The invention enables the preparation of valuable products having a pre-determined degree of long-chain branching using readily available Zeigler-Natta catalysts, commercially practiced techniques, and conventional equipment.

12 Claims, No Drawings

PROCESS FOR MAKING ETHYLENE POLYMER BLENDS WITH CONTROLLED LONG-CHAIN BRANCHING

FIELD OF THE INVENTION

The invention relates to a high-temperature solution process for making ethylene polymers having a controlled degree of long-chain branching.

BACKGROUND OF THE INVENTION

The high-temperature solution process is a versatile way to make ethylene polymer resins that are useful for blow molding, injection molding, films, coatings, and other applications. A number of these are practiced commercially by Dow Chemical, Nova Chemicals, Equistar Chemicals, and others. One type of high-temperature solution process is conducted by making the same or different polymers in two parallel reactors in a first reaction zone (see, e.g., U.S. Pat. No. 5,236,998). Products from the two reactors are then combined in a second reaction zone where polymerization continues. Optionally, a third reaction zone is used to complete the process.

The high-temperature solution process is usually performed using one or more Ziegler-Natta catalysts, and the products are substantially linear ethylene homopolymers or copolymers. The products have short-chain branching when comonomers are included, but they normally have little or no long-chain branching. Although the available product slate from the solution process is rich, it could potentially expand if long-chain branching could be easily introduced into the polymers. For example, HDPE resins that have substantial long-chain branching should be valuable for shrink-film applications.

Some metallocenes can provide ethylene polymers having long-chain branching. These catalysts generally have relatively few active sites compared with Ziegler-Natta catalysts, so they are poisoned easily by trace impurities commonly present in monomer feedstocks. Additionally, many metallocenes have relatively low thermal stability. Consequently, better ways to introduce long-chain branching into polymers made in the high-temperature solution process are still needed.

Among Ziegler-Natta catalysts, those containing a combination of titanium, magnesium, and aluminum (e.g., see U.S. Pat. No. 4,499,198), particularly ones based on magnesium silylamides, offer some advantages over earlier varieties based on titanium and aluminum or vanadium and aluminum, including high activity and the ability to incorporate comonomers efficiently. Use of these advanced Ziegler-Natta catalysts to somehow influence the amount of long-chain branching in a polymer has not been described.

In sum, the industry would benefit from ways to modify the high-temperature solution process to provide ethylene polymers with a controllable amount of long-chain branching. Ideally, the process would avoid catalysts having a tendency to deactivate in the presence of trace feedstock impurities, such as many metallocenes. A valuable process would not require invention and development of new catalysts and could be practiced easily without the need to extensively modify plant equipment. An ideal process would allow polyolefin manufacturers to tailor polymer properties and processability by "dialing in" a desired level of long-chain branching.

SUMMARY OF THE INVENTION

The invention relates to a high-temperature solution process for making an ethylene polymer blend having a controlled degree of long-chain branching. In one process step, ethylene is polymerized in the presence of a first Ziegler-Natta catalyst comprising titanium, magnesium, and aluminum in the absence of hydrogen to produce a first ethylene polymer component. We surprisingly found that this first component has substantial long-chain branching. In another step, ethylene is polymerized under conditions effective to produce a second ethylene polymer component having little or no long-chain branching. Both steps are performed at high temperature, i.e., at a temperature from 140° C. to 250° C. The first and second ethylene polymer components are combined to give a polymer blend. The degree of long-chain branching in the blend is controlled by adjusting the relative amounts of the first and second ethylene polymer components. Thus, the invention enables the preparation of valuable products having a pre-determined degree of long-chain branching using readily available Zeigler-Natta catalysts, commercially practiced techniques, and conventional equipment.

DETAILED DESCRIPTION OF THE INVENTION

The invention is a high-temperature solution process for making an ethylene polymer blend having a controlled degree of long-chain branching. The process involves ethylene polymerizations performed under different conditions such that the resulting polymers have either substantial or little or no long-chain branching. The polymerization products are combined to continue or complete the polymerization and provide the polymer blend.

In one step, ethylene is polymerized in the presence of a first Ziegler-Natta catalyst comprising titanium, magnesium, and aluminum in the absence of hydrogen to produce a first ethylene polymer component. Surprisingly, this first component has substantial long-chain branching.

The first Ziegler-Natta catalyst comprises titanium, magnesium, and aluminum. We surprisingly found that the magnesium-containing first Ziegler-Natta catalyst can provide, in the absence of hydrogen, a polymer having substantial long-chain branching. This contrasts with conventional wisdom, which holds that Ziegler-Natta catalysts will afford polyethylene with little or no long-chain branching regardless of whether or not hydrogen is present. As Comparative Examples 16-18 show, traditional (magnesium-free) Ziegler-Natta catalysts such as $TiCl_4/VOCl_3$ do not give polymers with long-chain branching when hydrogen is excluded.

The titanium in the first Ziegler-Natta catalyst can originate from a variety of sources, preferably titanium halides, alkoxides, and mixed halide/alkoxides. Examples include titanium tetrachloride, titanium tetrabutoxide, diethoxytitanium dichloride, or the like. Titanium tetrachloride is particularly preferred. The first Ziegler-Natta catalyst also includes magnesium, which often derives from metallic magnesium, dialkylmagnesium compounds, Grignard reagents, or magnesium halides, especially magnesium chloride. Aluminum, usually from aluminum alkyls or alkylaluminum halides, is also present. Additional elements can also be present. Vanadium, especially from vanadium halides, alkoxides, and mixed halide/alkoxides, is a preferred additional element. Suitable vanadium sources include, for example, vanadium tetrachloride, vanadyl chloride, vanadium tetrabutoxide, diethoxyvanadium dichloride, vanadium trichloride, or the like. Vanadium chloride is particularly preferred.

In a preferred aspect, the first Ziegler-Natta catalyst is prepared using an alkylmagnesium silylamide. Such catalysts are described in U.S. Pat. No. 4,499,198, the teachings of which are incorporated herein by reference. Preferably, the catalyst comprises the reaction product of an alkylmagnesium silylamide, an alkylaluminum compound, and a titanium compound. More preferably, the first Ziegler-Natta catalyst is a product formed by contacting an alkylmagnesium silylamide with an alkylaluminum dichloride, and then contacting that product with titanium tetrachloride or a mixture of titanium tetrachloride and vanadium oxytrichloride. In such catalysts, the Al/Mg molar ratio is preferably in the range of 2 to 10, more preferably from 3 to 5. Additionally, the Al to (Ti+V) molar ratio is preferably in the range of 1 to 20, more preferably from 3 to 15, most preferably about 10.

The polymerization with the first Ziegler-Natta catalyst is performed in the absence of hydrogen, and the resulting first ethylene polymer component has substantial long-chain branching. Long-chain branching in polyethylenes has been discussed at length elsewhere (see, e.g., *Macromolecules* 39 (2006) 1474). Numerous analytical methods, most of them indirect, can be used to estimate the amount of long-chain branching present in polyethylenes. In one approach, the rheological polydispersity of a molten resin is determined. An overall polydispersity ratio (PDR) can be measured using complex viscosity data as a function of complex modulus rather than frequency. An additional measure of rheological polydispersity is Er, which is determined from plots of storage modulus (G') versus loss modulus (G") and is a measure of high-molecular-weight-end polydispersity. Both PDR and Er are conveniently determined as discussed in R. Shroff and H. Mpyridis, "New Measures of Polydispersity from Rheological Data on Polymer Melts," *J. Appl. Polym. Sci.* 57 (1995) 1605 and U.S. Pat. No. 6,713,585. In general, the first ethylene polymer component has a relatively high PDR and Er value, each of which reflects the presence of long-chain branching. In particular, the PDR is typically >4, preferably from 5 to 50, more preferably from 6 to 30. The Er value for the first ethylene polymer component is typically >2, more preferably from 2.5 to 10.

Additional information about long-chain branching is available from gel permeation chromatography, extensional rheology, viscosity enhancement factor (VEF) measurements (see, e.g., U.S. Pat. No. 7,655,740 and copending application Ser. No. 11/897,438, filed Aug. 29, 2007, the teachings of which are incorporated herein by reference). Polymers that have substantial long-chain branching exhibit relatively high VEF values (typically >1.5).

Dynamic oscillatory frequency sweep experiments, particularly from plots of phase angle ($\delta$, usually in degrees) versus complex modulus (G*, usually in dynes/cm$^2$), can also be used. Polymers that have substantial long-chain branching will exhibit lower phase angles compared with similar polymers that lack long-chain branching. In a "snapshot" approach, we can consider the value of the phase angle at an arbitrarily set value of G. In general, the first ethylene polymer component will have a phase angle less than 70 degrees, preferably less than 67 degrees, more preferably less than 65 degrees when measured at G*=1×10$^5$ dynes/cm$^2$. In contrast, second ethylene polymer component will have a phase angle greater than 70 degrees, typically 71-75 degrees when measured at G*=1×10$^5$ dynes/cm$^2$.

Preferably, the first ethylene polymer component has an Er>2.0 and a phase angle at G*=1×10$^5$ dynes/cm$^2$ of less than 70 degrees.

An $\alpha$-olefin can be included in the step used to make the first ethylene polymer component. Suitable $\alpha$-olefins are well known. Preferred $\alpha$-olefins include propylene, 1-butene, 1-hexene, 1-octene, and the like, and mixtures thereof. 1-Butene, 1-hexene, and 1-octene are particularly preferred.

In another step of the inventive process, ethylene is polymerized under conditions effective to produce a second ethylene polymer component having little or no long-chain branching. Long-chain branching in this step is avoided using any of several approaches, alone or in combination, at the skilled person's discretion. Usually, long-chain branching is avoided by proper catalyst selection, use of hydrogen, or a combination of these.

In one suitable approach, for example, the same catalyst that was used to make the first ethylene polymer component is used, but hydrogen is introduced into the reactor so that a second ethylene polymer component having little or no long-chain branching is produced.

In another suitable approach, the second ethylene polymer component is made by polymerizing ethylene in the presence of a second Ziegler-Natta catalyst comprising titanium, vanadium, or both. Normally, this catalyst is not capable of making polyethylene with long-chain branching. If desired, however, the reaction can be performed in the presence of hydrogen to avoid long-chain branching in the second ethylene polymer component.

Preferably, the second Ziegler-Natta catalyst provides polyethylenes with little or no long-chain branching. Usually, the catalyst comprises Ti, V, or both, which can originate from any of the sources described earlier. Typically, this is a traditional Ziegler-Natta catalyst that is magnesium-free, such as titanium tetrachloride, vanadium oxytrichloride, vanadium tetrachloride, Ti(OBu)$_2$Cl$_2$, or the like, or mixtures thereof. Titanium tetrachloride and mixtures of TiCl$_4$ and VOCl$_3$ are particularly preferred.

An $\alpha$-olefin can be included in the step used to make the second ethylene polymer component. Suitable $\alpha$-olefins are well known. Preferred $\alpha$-olefins include propylene, 1-butene, 1-hexene, 1-octene, and the like, and mixtures thereof. 1-Butene, 1-hexene, and 1-octene are particularly preferred.

The second ethylene polymer component is optionally prepared in the presence of hydrogen. Normally, the amount of hydrogen used is adjusted to regulate polymer molecular weight, with greater amounts of hydrogen providing polymers of lower molecular weight (higher melt index). The hydrogen can be introduced by any convenient means. Normally, the hydrogen is supplied continuously to maintain a relatively constant concentration in the reactor.

In general, the second ethylene polymer component has relatively low PDR and Er values, which reflects the absence of long-chain branching. In particular, the PDR is typically <5, more preferably from 3 to 4. The Er value for the second ethylene polymer component is typically <2, more preferably from 0.8 to 1.8. The second ethylene polymer component will have a phase angle greater than 70 degrees, typically 71-75 degrees when measured at G*=1×10$^5$ dynes/cm$^2$.

Preferably, the second ethylene polymer component has an Er<2.0 and a phase angle at G*=1×10$^5$ dynes/cm$^2$ of greater than 70 degrees.

The polymerizations used to make the first and second ethylene polymer components are each performed at a temperature within the range of 140° C. to 250° C. The same or different temperatures can be used. Preferably, the reaction temperatures each range from 160° C. to 230° C., more preferably from 180° C. to 220° C. When an adiabatic process is used, the second ethylene polymer component is made at a relatively high temperature.

A solvent is optionally included. In the absence of a solvent, any unreacted ethylene and $\alpha$-olefins function as the solvent. Suitable solvents include saturated hydrocarbons, preferably ones that have a boiling point within the range of 30° C. to 150° C. Thus, suitable solvents include, e.g., pentanes, hexanes, heptanes, octanes, and the like, including cyclic isomers.

As the skilled person will recognize, the inventive process can be implemented using a variety of reactor configurations. In one approach, the polymerizations are performed in series such that the second ethylene polymer component is produced in the presence of the first ethylene polymer component.

In an adiabatic example of the series approach, the first ethylene polymer component is produced in the absence of hydrogen in a first reaction zone in two parallel reactors, designated "A" and "B" for convenience. The products from reactors A and B are combined in a second reaction zone, where polymerization continues, typically at a higher temperature, in the presence of additional ethylene using the heat of reaction to drive the polymerization to completion. In the second reaction zone, hydrogen is introduced, the catalyst is changed, or both to give the second ethylene polymer component. The degree of long-chain branching in the resulting polymer blend is controlled by adjusting the relative amounts of the first and second ethylene polymer components made in the first and second reaction zones. Optionally, a third reaction zone comprising a tubular or plug-flow ("non-back mixed") reactor is used to complete the polymerization.

In another reactor configuration, the first and second ethylene polymer components are produced separately, preferably in parallel reactors, and are then simply combined to give the polymer blend. For instance, in the set-up described in the paragraph above, reactor A is used with a first Ziegler-Natta catalyst in the absence of hydrogen to make the first ethylene polymer component (having long-chain branching), and reactor B is used with a second Ziegler-Natta catalyst to make the second ethylene polymer component (having little or no long-chain branching). In the second reaction zone, the products from reactors A and B are simply blended, with the degree of long-chain branching in the blend being controlled by adjusting the relative amounts of the first and second ethylene polymer components.

The skilled person will, of course, recognize other reactor configurations, catalyst combinations, hydrogen levels, and other protocols that are within the spirit and scope of the inventive process.

As noted above, the process of the invention can be performed adiabatically, with the heat generated in early reaction zones being retained and used to help continue or complete the polymerization in any later reaction zones. Either polymerization step can also be performed isothermally if desired.

The invention applies to high-temperature solution processes that employ small reactors, short reactor dwell times, and/or high-intensity mixing, as used in some commercial processes.

Additional aspects of the typical high-temperature solution process having applicability to the invention are disclosed in U.S. Pat. No. 5,236,998, the teachings of which are incorporated herein by reference.

The process offers numerous advantages. To name just a few: (1) enables the preparation of a family of products having varying degrees of long-chain branching; (2) uses readily available catalysts, commercially practiced techniques, and conventional equipment; (3) upgrades the Ziegler-Natta product portfolio by allowing a pre-determined amount of long-chain branching, which can improve physical and mechanical properties (e.g., tensile strength, flexibility, environmental stress crack resistance, etc.) or processability; and (4) avoids metallocenes, which are often expensive, use costly activators, and have not been entirely satisfactory for use in the high-temperature solution process.

The following examples merely illustrate the invention. Those skilled in the art will recognize many variations that are within the spirit of the invention and scope of the claims.

EXAMPLE A

Typical Preparation of Catalyst A

Hexamethyldisilazane ("HMDS," 8.5 mL, 41 mmol) is added dropwise under nitrogen with stirring to a solution of octyl(butyl)magnesium ($Bu_3Mg_2Oct$, 1 mole of HMDS per mole of Mg) in heptane. A slight temperature increase and a decrease in solution viscosity are noted. After 2 h, the reaction is considered complete, and the resulting alkylmagnesium bis(trimethylsilyl)amide product is set aside. If required, heptane is added to adjust the magnesium concentration to 0.23 M. In a separate flask, a solution of ethylaluminum dichloride (24.2 mL of 1.5 M solution in heptane) is heated to 110° C. The magnesium silylamide solution is then added (Al:Mg molar ratio=4:1) dropwise. A white solid forms, and the product is stirred for 2 h. The temperature is reduced to 55° C., and 1:1 $TiCl_4/VOCl_3$ (7.2 mL of 0.5 M solution in heptane) is added dropwise to the white slurry. The slurry turns brownish purple. After stirring for 2 h, heating is discontinued and the flask is allowed to cool. The catalyst slurry ("Catalyst A") is further diluted with heptane or Isopar H solvent for the polymerization to experiments described below.

EXAMPLE B

Typical Preparation of Catalyst B

HMDS (8.1 mL, 39 mmol) is added dropwise under nitrogen with stirring to a solution of butyl(ethyl)magnesium (1 mole of HMDS per mole of Mg) in heptane (40 mL). Some bubbling and a slight temperature increase are noted. Additional heptane is added to adjust the magnesium concentration to 0.29 M. After 2 h, the reaction is considered complete. The resulting alkylmagnesium bis(trimethylsilyl)amide product is warmed to 55° C., and a solution of ethylaluminum dichloride (104 mL of 1.5 M solution in heptane; Al:Mg molar ratio=4:1) is slowly added. A white solid forms; an exotherm of about 10° C. is noted. The slurry is stirred for 2 h and the temperature is reduced to 55° C. Titanium tetrachloride (9.6 mL of 0.5 M solution in heptane) is added dropwise to the white slurry, which turns brown. After stirring for 2 h, heating is discontinued and the flask is allowed to cool. The catalyst slurry ("Catalyst B") is further diluted with heptane or Isopar H solvent for the polymerization experiments described below.

EXAMPLES 1-6

High-Temperature Solution Polymerization Using Catalyst A and No Hydrogen

A four-liter, baffled semi-batch reactor equipped with a magnetically driven stirrer is charged with Isopar H solvent, 1-octene, and ethylene (see Table 1 for amounts). The reactor is equilibrated at the desired reaction temperature (see Table 1). Triethylaluminum (50 µL) is then injected, stirred for five seconds, followed immediately by injection of the catalyst slurry (~$10^{-5}$ mol). Polymerization begins, and ethylene is continuously fed on demand to maintain the pressure shown in Table 1. After 10 min, the ethylene flow is discontinued and the reactor contents are rapidly discharged into a collection vessel that contains a catalyst deactivation mixture of BHT in methanol. The resulting polymer slurry is filtered, and the solids are dried under vacuum (>6 h, 120° C.). See Table 1 for reaction conditions and Table 2 for polymer properties.

COMPARATIVE EXAMPLES 7-11

High-Temperature Solution Polymerization Using Catalyst A with Hydrogen Added The procedure of Examples 1-6 is generally followed, except that the reactor charge includes hydrogen in each case. See Table 1 for reaction conditions and Table 2 for polymer properties.

Examples 1-6 and Comparative Examples 7-11 show that in a high-temperature solution process for making polyethylene, Ziegler-Natta catalysts comprising titanium, vanadium, magnesium, and aluminum (preferably Ti, V, Al, and an alkylmagnesium silylamide), when used in the absence of hydrogen, provide polyethylenes with long-chain branching (as evidenced by a phase angle at $G^*=1\times10^5$ dynes/cm$^2$ of less than 70°). In a process that also uses a traditional Ziegler-Natta catalyst, this can be used to adjust the amount of long-chain branching in polymer blends to a desirable level.

EXAMPLES 12 AND 13

High-Temperature Solution Polymerization Using Catalyst B and No Hydrogen

The procedure of Examples 1-6 is generally followed, except that Catalyst B is used instead of Catalyst A. Other adjustments to reaction conditions are shown in Table 1, and polymer properties are reported in Table 2.

Examples 12-13 and Comparative Examples 14-15 show that in a high-temperature solution process for making polyethylene, Ziegler-Natta catalysts comprising titanium, magnesium, and aluminum (preferably Ti, Al, and an alkylmagnesium silylamide), when used in the absence of hydrogen, provide polyethylenes with long-chain branching (as evidenced by a phase angle at $G^*=1\times10^5$ dynes/cm$^2$ of less than 70°). In a process that also uses a traditional Ziegler-Natta catalyst, this can be used to adjust the amount of long-chain branching in polymer blends to a desirable level.

COMPARATIVE EXAMPLES 16-18

High-Temperature Solution Polymerization Using V—Ti Catalyst with and without Hydrogen Added The procedure of Examples 1-6 is generally followed to make an ethylene homopolymer, but the catalyst is a traditional mixture of titanium tetrachloride and vanadium oxytrichloride (molar Ti:V=1:1). See Table 1 for other adjustments to reaction conditions. Table 2 reports polymer properties.

The results show that the traditional Ti—V catalyst (with no magnesium content) gives polyethylene having little or no long-chain branching unless a large amount of hydrogen is introduced, as in Comparative Example 16. In that example, however, the molecular weight is undesirably low.

The preceding examples are meant only as illustrations. The following claims define the invention.

COMPARATIVE EXAMPLES 14 AND 15

High-Temperature Solution Polymerization Using Catalyst B with Hydrogen Added The procedure of Examples 12 and 13 is generally followed, except that the reactor charge includes hydrogen in

TABLE 1

Effect of Catalyst and Hydrogen on Long-Chain Branching: Polymerization Conditions

| Ex | Catalyst | Cat. amt., mL | TEAL (1M), mL | Ethylene, psi | 1-octene, mL | $H_2$, $\Delta$ psi$^2$ | Isopar H, mL | Run temp, °C. | Run time, sec |
|---|---|---|---|---|---|---|---|---|---|
| 1 | A | 0.45 | 0.05 | 330 | 220 | 0 | 1059 | 200 | 600 |
| 2 | A | 0.45 | 0.05 | 330 | 220 | 0 | 1059 | 200 | 600 |
| 3 | A | 0.45 | 0.05 | 330 | 220 | 0 | 1059 | 200 | 600 |
| 4 | A | 0.45 | 0.05 | 330 | 110 | 0 | 1169 | 200 | 600 |
| 5 | A | 0.45 | 0.05 | 330 | 330 | 0 | 979 | 200 | 600 |
| 6 | A | 0.45 | 0.05 | 330 | 440 | 0 | 839 | 200 | 600 |
| C7 | A | 0.45 | 0.05 | 345 | 220 | 65 | 1059 | 210 | 600 |
| C8 | A | 0.45 | 0.05 | 330 | 220 | 95 | 1059 | 200 | 600 |
| C9 | A | 0.45 | 0.05 | 330 | 110 | 95 | 1059 | 200 | 600 |
| C10 | A | 0.45 | 0.05 | 330 | 220 | 55 | 1059 | 200 | 600 |
| C11 | A | 0.45 | 0.05 | 330 | 220 | 15 | 1059 | 200 | 600 |
| 12 | B | 0.45 | 0.05 | 330 | 220 | 0 | 1059 | 200 | 600 |
| 13 | B | 0.45 | 0.05 | 275 | 220 | 0 | 1059 | 160 | 600 |
| C14 | B | 0.03 | 0.03 | 275 | 220 | 250 | 1059 | 160 | 90 |
| C15 | B | 0.20 | 0.20 | 275 | 220 | 250 | 1059 | 160 | 90 |
| C16 | C[1] | 0.5/0.5 | 0.25 | 500 | 0 | 700 | 1087 | 240 | 600 |
| C17 | C | 0.5/0.5 | 0.25 | 500 | 0 | 0 | 1087 | 240 | 600 |
| C18 | C | 0.5/0.5 | 0.25 | 500 | 0 | 0 | 1087 | 240 | 600 |

[1]Catalyst C is a traditional TiCl$_4$/VOCl$_3$ catalyst at 1:1 mole ratio Ti/V.
[2]Hydrogen is discharged from a 75-cm$^3$ vessel.

TABLE 2

Effect of Catalyst and Hydrogen on Long-Chain Branching: Polymer Properties

| Ex | Catalyst | PE yield, g | Density (g/cm$^3$) | Mw (K) | PDR | Er | Phase angle (°) at $G^* = 1 \times 10^6$ dynes/cm$^2$ |
|---|---|---|---|---|---|---|---|
| 1 | A | 21.7 | 0.920 | 248 | 7.6 | 2.5 | 64 |
| 2 | A | 21.3 | 0.920 | 229 | 12 | 3.7 | 59 |

TABLE 2-continued

Effect of Catalyst and Hydrogen on Long-Chain Branching: Polymer Properties

| Ex | Catalyst | PE yield, g | Density (g/cm$^3$) | Mw (K) | PDR | Er | Phase angle (°) at G* = 1 × 10$^6$ dynes/cm$^2$ |
|---|---|---|---|---|---|---|---|
| 3 | A | 20.6 | 0.919 | 233 | 26 | 6.9 | 50 |
| 4 | A | 20.7 | 0.928 | 253 | 14 | 4.3 | 57 |
| 5 | A | 21.9 | 0.914 | 231 | 10 | 3.4 | 61 |
| 6 | A | 19.7 | 0.911 | 206 | 6.7 | 2.1 | 66 |
| C7 | A | 19.5 | 0.926 | 98 | 3.6 | 0.8 | 73 |
| C8 | A | 24.3 | 0.921 | 99 | 3.8 | 0.9 | 73 |
| C9 | A | 26.2 | 0.933 | 105 | 4.0 | 1.1 | 73 |
| C10 | A | 21.1 | 0.926 | 126 | 3.8 | 0.9 | 73 |
| C11 | A | 21.7 | 0.922 | 153 | 3.9 | 1.2 | 72 |
| 12 | B | 16.1 | 0.919 | 155 | 64 | 8.0 | 50 |
| 13 | B | 34.8 | 0.915 | — | 505 | 7.6 | <50 |
| C14 | B | 25.2 | — | 88 | 4.1 | 1.1 | 74 |
| C15 | B | 19.9 | — | — | 5.7 | 1.8 | 71 |
| C16 | C[1] | 6.7 | 0.957 | 94 | 8.0 | 1.7 | <70 |
| C17 | C | 15.1 | — | 150 | 6.8 | 1.5 | >70 |
| C18 | C | 15.7 | 0.958 | 159 | 7.2 | 1.8 | >70 |

[1] Catalyst C is a traditional TiCl$_4$/VOCl$_3$ catalyst at 1:1 mole ratio Ti/V.

We claim:

1. A polymerization process comprising the steps:
   a) polymerizing ethylene in the presence of a first Ziegler-Natta catalyst comprising titanium, magnesium, and aluminum at a temperature from 140° C. to 250° C. in the absence of hydrogen to produce a first ethylene polymer component having a first degree of long-chain branching that corresponds to a rheological polydispersity from 2.5 to 10;
   b) polymerizing ethylene at a temperature from 140° C. to 250° C. under conditions effective to produce second ethylene polymer component having a second degree of long chain-branching that corresponds to a rheological polydispersity from 0.8 to 1.8; and
   c) combining the first and second ethylene polymer components to give a polymer blend wherein a third degree of long-chain branching in the blend is controlled by adjusting the relative amounts of the first and second ethylene polymer components.

2. The process of claim 1 wherein steps (a) and (b) are performed in series such that the second ethylene polymer component is produced in the presence of the first ethylene polymer component.

3. The process of claim 2 wherein the first ethylene polymer component is produced in two parallel reactors.

4. The process of claim 1 wherein steps (a) and (b) are performed in parallel reactors.

5. The process of claim 1 wherein the first Ziegler-Natta catalyst is prepared using an alkylmagnesium silylamide.

6. The process of claim 5 wherein the first Ziegler-Natta catalyst comprises the product formed by: (i) contacting the alkylmagnesium silylamide with an alkylaluminum dichloride, and (ii) contacting the product from step (i) with titanium tetrachloride or a mixture of titanium tetrachloride and vanadium oxytrichloride.

7. The process of claim 1 wherein the second ethylene polymer component is prepared in the presence of hydrogen.

8. The process of claim 1 wherein the second ethylene polymer component is prepared in the presence of a second Ziegler-Natta catalyst comprising titanium, vanadium, or both.

9. The process of claim 8 wherein the second Ziegler-Natta catalyst comprises a mixture of titanium tetrachloride and vanadium oxytrichloride.

10. The process of claim 1 wherein the first ethylene polymer component has a phase angle at G*=1×10$^5$ dynes/cm$^2$ of less than 70 degrees.

11. The process of claim 1 wherein the second ethylene polymer component has a phase angle at G*=1×10$^5$ dynes/cm$^2$ of greater than 70 degrees.

12. The process of claim 1 wherein either or both of steps (a) and (b) is performed in the presence of an α-olefin selected from the group consisting of 1-butene, 1-hexene, and 1-octene.

* * * * *